May 23, 1939.　　　　J. T. DOTY　　　　2,159,137

HYDRAULIC CLUTCH

Filed Feb. 18, 1937

Inventor.
J. T. Doty
By Hazard and Miller
Attorneys.

Patented May 23, 1939

2,159,137

UNITED STATES PATENT OFFICE 2,159,137

HYDRAULIC CLUTCH

John Trimble Doty, Bellflower, Calif., assignor of one-half to Frederick W. Weber, Southgate, Calif.

Application February 18, 1937, Serial No. 126,419

4 Claims. (Cl. 192—85)

My invention concerns a hydraulically operated clutch and is of a type in which internally expanding clutch shoes are forced outwardly to engage the inside surface of a cylindrical clutch drum. A characteristic of my invention is that my hydraulic clutch uses certain operating structures somewhat similar to a hydraulic brake as used on motor vehicles. For instance, the clutch drum is similar to a brake drum, the brake shoes are also somewhat similar to the brake shoes with their lining as used in motor vehicles and the shoes may be forced outwardly or spread apart by the operation of hydraulic fluid in a clutch cylinder having somewhat the same action as the wheel cylinders in wheel brake assemblies.

However in my invention the clutch shoes with the clutch cylinder are rotated continuously and the clutch drum is engaged by the shoes when desired in order to drive, that is, to rotate the clutch drum and an operating structure connected therewith.

An object and feature of my invention is employing a constantly driven shaft as the mounting for the clutch shoes and the clutch cylinder so that these are constantly rotated. The master or pressure cylinder is formed in the shaft or connected to the shaft so that such cylinder rotates on the axis of the shaft. The piston used for compressing the hydraulic fluid in the master cylinder operates axially of the shaft and rotates with the shaft. The connecting link or piston rod operates by a thrust action against the interior of the piston and as this does not rotate, an anti-friction thrust bearing is used between the innner end of the link or piston rod and the base of the piston.

Therefore in my invention I have but a short connecting hydraulic fluid pipe between the master cylinder and the clutch cylinder on account of the fluid chamber of the master cylinder being located in the center of the constantly rotating shaft. Thus with my invention I provide a compact construction of a hydraulic clutch in which a constantly rotating shaft or a shaft driven by a main clutch when desired has incorporated therein the master cylinder, this being by the shaft having a cylindrical bore extending from one end in which open end is inserted the piston with the connecting link or piston rod extending out through the end of the piston which is made in the manner of a cup, thus by operating the link or piston rod by a hand actuated lever or the like, a very accurate control may be given to the driven member of the clutch, that is, the clutch drum and a gradual picking up of the load may be made through the medium of the rotating clutch shoes which are hydraulically operated, a slippage may be given when desired and a tight clutch connection driving the drum therefore at the same speed as the driving shaft.

Another object and feature of my invention relates to a specific application of my hydraulic clutch, this being in connection with a winch or reel for winding in or releasing a cable, thus the winch drum is hollow and rotatably mounted by anti-friction bearings on the driving shaft. One flange of the winch drum has the clutch drum connected thereto, this latter as above mentioned being cylindrical. Therefore in effect the winch drum and the clutch form a compact unit, the main or master cylinder of the clutch forming part of the shaft on which the winch drum rotates when released and the winch drum unwinding. Therefore by my construction the winch drum may be held at rest while the driving shaft and the clutch shoes rotate inside of the winch drum and the clutch drum.

My invention is illustrated in connection with the accompanying drawing in which.

Figure 1:
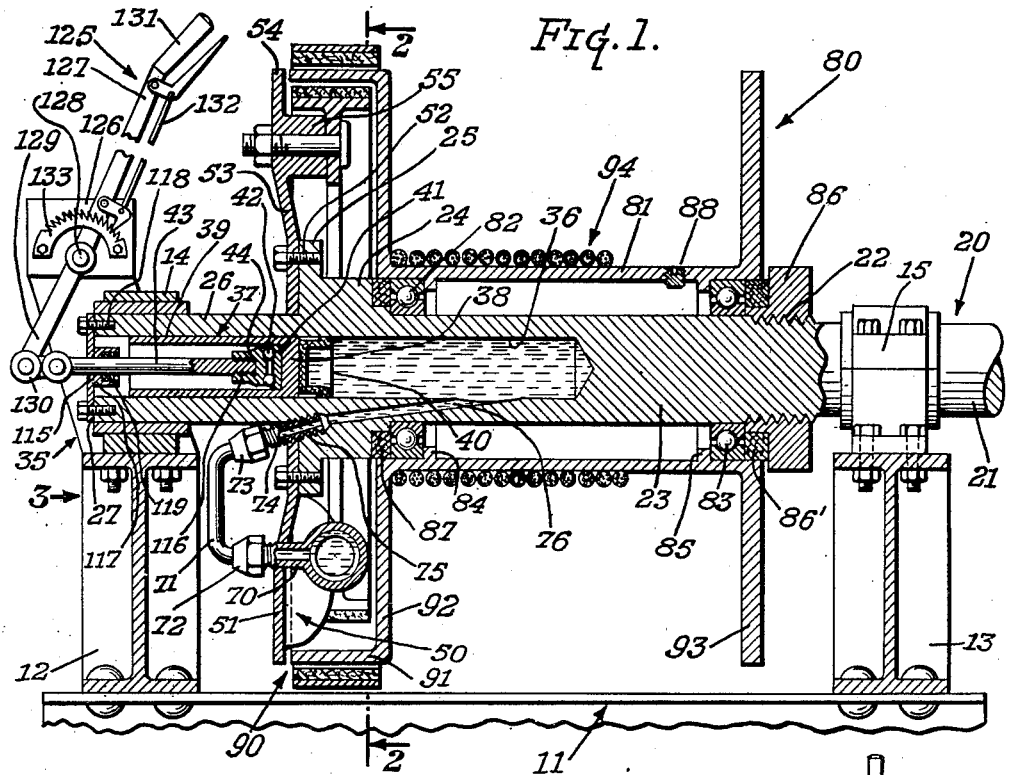
Fig. 1 is a vertical longitudinal section on the line 1—1 of Fig. 2 through the assembly of the hydraulic clutch and a winch drum showing certain features of the mounting of the driving shaft and a clutch control lever in elevation.
Figures 2, 3:
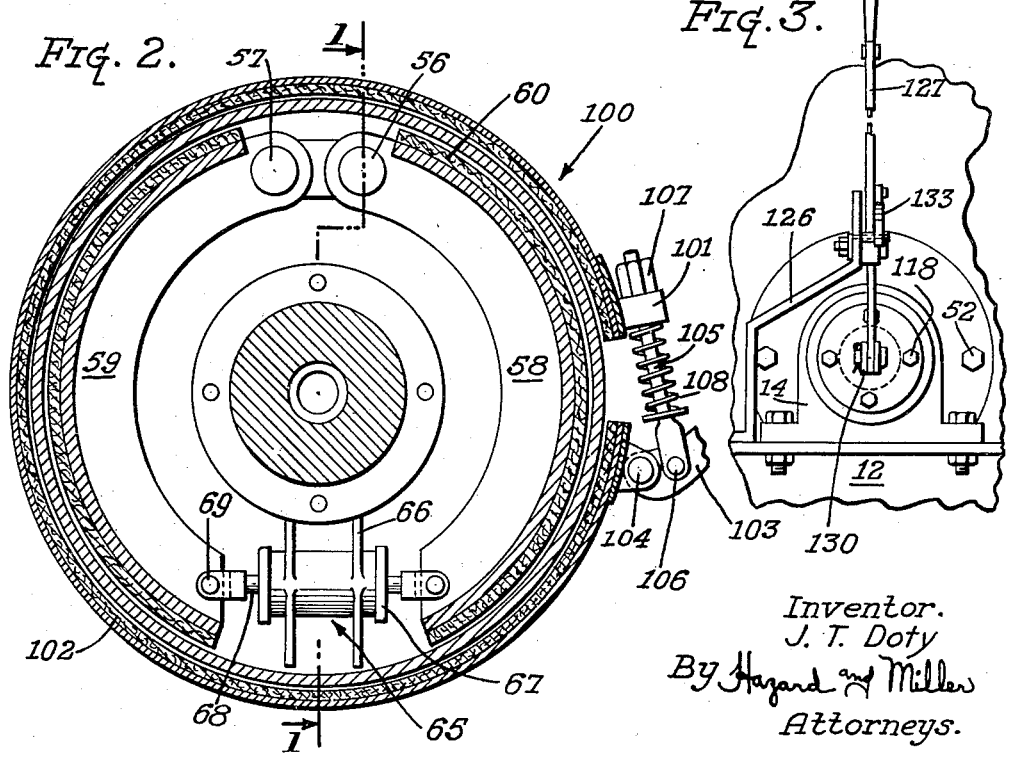
Fig. 2 is a vertical transverse section on the line 2—2 of Fig. 1 in the direction of the arrows omitting certain details of the internal expanding clutch shoes which are similar to those now used in automotive brakes.
Fig. 3 is an end elevation taken in the direction of the arrow 3 of Fig. 1, remote parts being omitted.

In illustrating my invention I show a machine bed 11 which may be a winch bed and this has two journal brackets 12 and 13 spaced apart and on each of these is mounted split journal blocks 14 and 15 which may be of any desired type and character. The driving shaft designated by the assembly numeral 20 has a relatively reduced cylindrical end 21 journalled in the journal block 15, a threaded section 22 of which the threads are preferably larger than the cylindrical section 21. Extending from the threads is a relatively large cylindrical section 23. This has an enlargement 24 with a flange 25 formed integral therewith. Outside of the flange there is a cylindrical section 26 which in the illustration is of the same diameter as the section 23. This outer section is journalled in the block 14 and terminates at 27.

The master cylinder assembly designated by the numeral 35 employs a cylindrical bore 36 in the enlarged portion of the shaft extending inwardly from the end 27. Slidably mounted in this cylinder is the main piston 37. Such piston has a metal head 38 and a wall or skirt 39. Thus the cylinder is of a cup type. A rubber or flexible piston cup 40 bears against the head 38. On the opposite side of the head I provide a thrust race 41 of an anti-friction bearing. This is shown as a ball bearing, having balls 42 therein. An operating link or piston rod 43 has the complementary race 44 at its inner end engaging the balls of the anti-friction bearing. This link extends outwardly beyond the end of the shaft to be manipulated in any desired manner. In my construction as the shaft rotates the piston and the piston cup rotate with the shaft, there being sufficient friction between the cylinder 36 and the piston and piston cup so that even against the thrust of the piston rod these rotate with and at the same speed as the shaft. However the link or piston rod preferably does not rotate but has the anti-friction bearing form the connection between the piston rod and the piston. It will of course be manifest that if desired the piston rod could have a connection with the piston so that it would rotate therewith and use an operating connection at the opposite end of the rod which would permit this rotation.

The mounting structure for the clutch shoes designated by the assembly numeral 50 employs a substantially flat disk 51 with an opening at the center, this opening accommodating the cylindrical section 26 of the shaft and is secured to the flange 25 by bolts 52. This disk has a slightly outward flare as indicated at 53 and has a peripheral edge 54. A pivot block 55 is secured or formed integral with the disk 51 and has two pivot studs 56 and 57 mounted thereon forming the pivots for the clutch shoes 58 and 59. These have the clutch lining 60 secured to an outer flange of these shoes. The construction may be substantially the equivalent to that now used in brake shoes and linings for motor vehicles.

The clutch cylinder 65 is rigidly connected to the disk 51 by webs 66 preferably welded to the disk. This has opposite cylinder heads 67 through which operate the short links or piston rods 68 having a pivotal connection 69 to the brake shoes 58 and 59. This clutch cylinder may have the same general characteristics of construction as used in brake cylinders. A tubular neck 70 extends from one side of the cylinder 65 through an opening in the disk 51. A hydraulic connecting pipe 71 has a coupling 72 illustrated as threaded on the neck 70 and has an opposite end coupling 73 fitted on the threaded nipple 74 which nipple is threaded into a socket 75 in the enlargement 24 of the shaft 20 and from this socket there extends a fluid duct 76 to the cylinder 36, the point of connection being beyond any inward position of the piston cup 40.

The clutch drum and winch assembly designated by the numeral 80 employs a winch drum or reel 81 journalled on anti-friction bearings 82 and 83. The drum is illustrated as having internal shoulders 84 and 85 engaging these bearings which are illustrated as ball bearings having an inner race with a snug fit on the section 23 of the shaft 20 and an outer race fitting snugly in the winch drum 81. A clamping nut 86 is threaded on the threaded section 22 of the shaft 20 and confines a felt or similar grease packing 86'. Another felt or similar grease packing 87 is located between the bearing 82 and the enlargement 24 on the shaft 20. A removable grease plug 88 in the winch drum permits packing the space between this drum and the shaft 20 with lubricating grease.

The clutch drum 90 has a cylindrical drum section 91 connected by an integral disk forming a flange 92 also formed integral or welded to the winch drum 81. This winch drum has a complementary flange 93 for confining the cable. The cable wound on the winch drum is indicated by the numeral 94. The winch is controlled for instance when unwinding free by an external brake assembly designated by the numeral 100. This may be of a conventional type and is illustrated as provided with a supporting lug 101 attached to a fixed structure, an external contracting brake band with lining 102, this having a brake lever 103 pivotally connected at 104 to the free end of the band. The lever is pivoted on a bolt 105 at 106, such bolt being slidable in the lug 101 and having a nut 107 on one end and a coil compression spring 108 bearing against this lug and a washer secured to the bolt. By this means by operating the brake lever 103 the external contracting brake operates on the exterior of the clutch drum 90.

To guide the operating link or piston rod 43 in a rectilinear motion I provide a guide cup 115 (note Fig. 1) through which the piston rod extends and for convenience of assembling the inner end of the rod, has a threaded connection 116 with the race structure 44 at the inner end of the rod. A brake-like packing gland 117 has an opening for the rod 43 and is secured by bolts 118 to the end 27 of the hollow portion of the shaft 20. Packing 119 forms a dust and grease tight packing for the operation of the main piston 37. The clutch operating lever assembly 125 employs a stationary bracket 126 or the like extending upwardly in any suitable manner from the journal bracket 12 and this has a hand operated lever 127 pivoted at 128 to the bracket. The lower end 129 connects by a link 130 to the outer end of the piston rod 43. A hand grip 131 is at the other end of the lever, such lever being provided with a latch 132 engaging a tooth quadrant 133 on the bracket 126. In the arrangement shown a pull on the handle end 131 thrusts the piston rod and piston inwardly, thus forcing the hydraulic fluid to the clutch cylinder 65 and thus applying the internal expanding clutch shoes 58 and 59. On the reverse motion a spring or other device in the cylinder 65 retracts the clutch shoes and hence forces the hydraulic fluid from the cylinder 65 back to the main cylinder 36 thereby forcing the piston outwardly. Thus there is always a pressure and contact through the anti-friction bearing between the piston rod 43 and the piston 37.

The manner of operating my hydraulic clutch when used with a winch is substantially as follows: for instance, presuming the cable is used to hoist a load, while the connection is being made to the load, the hydraulic clutch is open, thus the shaft 20 is turning without operating the winch and this may be held stationary by the external contracting brake 100. The clutch may then be operated to its closed position. This can be done gradually so that the load is taken up through the clutch shoes 58 and 59 and at the same time the external contracting brake may be eased off so that the winch structure rotates with the shaft and at the same speed, thus winding in the cable. The winch may be stopped for instance suspending a load by opening the clutch, that is, releasing the clutch shoes 58 and 59 and applying the external contracting brake. A free drop of a load on the end of a cable through the action of gravity may be controlled through the manipulation of the external contracting brake.

While I have illustrated my invention as applied to a winch assembly, it will be obvious that a hydraulic clutch of this type may be used for other types of work and in many of these other applications it is not necessary to use a brake on the clutch drum 90. It will be also obvious that the clutch assembly may be located at the opposite end of the winch construction using a fluid duct such as 76 leading from the bottom of the main cylinder 36.

Various changes may be made in the details of the construction without departing from the spirit or scope of the invention as defined by the appended claims.

I claim:

1. In a hydraulic clutch, the combination of a rotatably mounted shaft having a main hollow cylinder therein, a piston operative in said cylinder, a piston rod operatively connected to the piston, a clutch shoe support having clutch shoes connected to said shaft to rotate therewith, a clutch cylinder mounted on said support, a hydraulic connection from the main cylinder to the clutch cylinder, a connection between the clutch cylinder and the clutch shoes, a clutch drum rotatably mounted on the said shaft and having its axis concentric with the axis of the shaft and the axis of the main cylinder and means for operating the piston rod, the piston being adapted to rotate with the shaft due to frictional contact therewith, the piston rod being non-rotatable, a thrust bearing between the piston rod and the piston and means to guide the piston rod in a rectilinear motion.

2. In a hydraulic clutch, the combination of a rotatably mounted shaft having a main cylinder extending inwardly from one end of the shaft, the axis of the cylinder and the shaft being coincident, a piston slidable in the cylinder, a piston rod having one end engaging the piston and the opposite end extending outwardly beyond the end of the shaft, a rotating structure connected to the shaft and having a clutch cylinder mounted thereon and internal expanding clutch shoes, a hydraulic connection from the main cylinder to the clutch cylinder, a mechanical connection from the clutch cylinder to the clutch shoes, means to operate the piston rod in a rectilineal motion, said means preventing rotation of the piston rod, an anti-friction thrust bearing between the piston rod and the piston, a clutch drum rotatably mounted on the said shaft with its axis coincident with the axis of the shaft, the shoes being positioned to engage the inside surface of the clutch drum.

3. In a hydraulic clutch as claimed in claim 2, the clutch drum having a winch drum connected thereto and mounted to rotate on the shaft with the axis of the winch drum coincident with the axis of the shaft and the clutch drum, the winch drum being adapted for winding a cable thereon.

4. In a device as described, a rotatably mounted shaft having a main cylinder extending in the shaft from one end and concentric with the axis of the shaft, a piston in the cylinder and rotated with the cylinder by frictional contact, a rectilineally movable piston rod, an anti-friction thrust bearing between the inner end of the rod and the piston, an operating means for reciprocating said rod having a connection to the rod to restrain the rod from rotation and a fluid duct extending through a portion of the shaft from the said cylinder.

JOHN TRIMBLE DOTY.